(12) United States Patent
Monagle et al.

(10) Patent No.: US 7,399,495 B2
(45) Date of Patent: Jul. 15, 2008

(54) PROTEIN PRODUCT IMPARTING HIGH WATER DISPERSIBILITY

(75) Inventors: Charles W. Monagle, Fort Wayne, IN (US); Arthur H. Konwinski, Fort Wayne, IN (US)

(73) Assignee: Solae, LLC, St. Louis, MO (US)

( * ) Notice: Subject to any disclaimer, the term of this patent is extended or adjusted under 35 U.S.C. 154(b) by 158 days.

(21) Appl. No.: 10/426,290

(22) Filed: Apr. 30, 2003

(65) Prior Publication Data

US 2004/0043127 A1 Mar. 4, 2004

Related U.S. Application Data

(60) Provisional application No. 60/376,788, filed on Apr. 30, 2002.

(51) Int. Cl.
*A23J 1/14* (2006.01)
(52) U.S. Cl. ..................... 426/656; 426/634
(58) Field of Classification Search .......... 426/634, 426/656
See application file for complete search history.

(56) References Cited

U.S. PATENT DOCUMENTS

| 3,840,996 | A | 10/1974 | Grindstaff et al. |
| 3,988,511 | A | 10/1976 | Schapiro |
| 4,016,337 | A | 4/1977 | Hsu |
| 4,209,545 | A | 6/1980 | Schapiro |
| 4,288,460 | A | 9/1981 | Ciliberto et al. |
| 4,507,328 | A | 3/1985 | Schapiro et al. |
| 4,608,203 | A | 8/1986 | Akasaka et al. |
| 4,642,238 | A * | 2/1987 | Lin et al. .................. 426/74 |
| 4,985,270 | A | 1/1991 | Singer et al. |
| 5,021,248 | A * | 6/1991 | Stark et al. ................ 426/96 |
| 5,693,516 | A | 12/1997 | Blinkovsky |
| 6,221,381 | B1 | 4/2001 | Shelford et al. |
| 6,287,616 | B1 | 9/2001 | Beeson et al. |
| 6,517,876 | B2 * | 2/2003 | Tsukuda et al. .......... 426/89 |

FOREIGN PATENT DOCUMENTS

GB 1 396 729 6/1975

* cited by examiner

*Primary Examiner*—Anthony Weier
(74) *Attorney, Agent, or Firm*—James L. Cordek; Holly M. Amjad

(57) ABSTRACT

A method of imparting high water dispersibility to a protein product or protein-containing material, such as a powdered or particulate protein product, which method includes adding a surfactant and a flow enhancing agent to the protein product. The method is applicable to vegetable protein products, such as soy protein, and is also applicable to non-vegetable protein products, such as casein. Additionally, the method is particularly useful for imparting high water dispersibility to protein products in which greater than about 80 wt. % of the protein therein is water soluble protein.

4 Claims, 1 Drawing Sheet

US 7,399,495 B2

PROTEIN PRODUCT IMPARTING HIGH WATER DISPERSIBILITY

CROSS REFERENCE TO RELATED APPLICATIONS

This application claims the benefit under Title 35, U.S.C. § 119(e) of U.S. Provisional Patent Application Ser. No. 60/376,788, entitled METHOD OF IMPARTING HIGH WATER DISPERSABILITY TO A PROTEIN PRODUCT AND THE PRODUCT THEREOF, filed on Apr. 30, 2002.

BACKGROUND OF THE INVENTION

1. Field of the Invention

The present invention relates to a method of imparting high water dispersibility to protein products, and the resulting products thereof.

2. Description of the Related Art

Dry protein products are often used as ingredients in consumer food and drink products, and particularly in "dry-mix" food and drink products which are sold in a powdered or particulate form, to which water is added by the consumer or end-user for consumption. One example of such a product is powdered non-fat dry milk. High water dispersibility of such protein products in water is an important feature, both for ease of preparation of the final products and for preventing clumping of the products as same are prepared.

Also, dry protein products are widely used as ingredients in the food industry for large scale production of food products. In many cases, it is a distinct advantage for users to be able to add a dry protein ingredient into water based formulations without the need for expensive high shear mixing equipment. Enhanced water dispersibility is an essential characteristic of dry protein products for use in low speed, low shear mixing processes. Also, low speed, low shear mixing processes, which are made possible with dispersibility enhanced ingredients, offer reduced foam formation, another important benefit to users.

It is known to add a surfactant, such as soy lecithin, to a dry, powdered or particulate protein product to impart water dispersibility to the protein product. The addition of surfactants to dry protein products sufficiently enhances the water dispersibility of most protein products, such as those in which less than about 80 wt. % of the protein therein is water soluble. Powdered protein products which have greater than about 80 wt. % of the protein therein being water soluble tend to spontaneously form gelled particles when wetted. The addition of surfactant alone to dry protein products which have greater than about 80 wt. % of the protein therein being water soluble has not been found to sufficiently enhance the water dispersibility of such products.

One known method for imparting increased water dispersibility to dry protein products is agglomeration, which generally involves combining the particles in a smaller particle sized material to form a material having larger, more water dispersible particles. However, agglomeration is disadvantageous in that same tends to be a rather expensive and complex process.

Therefore, there is a need in the food industry of a more cost effective method for enhancing the water dispersibility of dry protein products, and in particular, for enhancing the water dispersibility of powdered protein products in which greater than about 80 wt. % of the protein therein is water soluble protein.

SUMMARY OF THE INVENTION

The present invention provides a method of imparting high water dispersibility to protein products or protein-containing materials, such as powdered or particulate protein products, which method includes adding a surfactant and a flow enhancing agent ("flow agent") to the protein products. The present invention is applicable to vegetable protein products, such as soy protein, and is also applicable to non-vegetable protein products, such as casein. Additionally, the present method is particularly useful for imparting high water dispersibility to protein products in which about 80 wt. % or more of the protein therein is water soluble protein.

Suitable surfactants include fluidized soybean lecithins or soybean oil/lecithin blends, and suitable flow agents include amorphous precipitated silicas, for example. An exemplary soy protein starting material may be prepared by first providing a substantially defatted soy protein, such as soy white flakes or soy flour. Thereafter, the protein in the soy material is extracted by water extraction, and the resulting protein extracted liquid is separated from the remaining solids. Optionally, the protein within the protein extracted liquid is concentrated, such as by an ultrafiltration process. Thereafter, the protein extracted liquid is pasteurized and subsequently dried to form a soy protein powder. The soy protein powder may contain a high level of soluble protein, for example, wherein about 80 wt. % or more of the protein therein is water soluble protein.

The protein product is mixed with a surfactant and with a flow agent to impart high water dispersibility to the protein product. The surfactant may be added to the protein product before the flow agent, or alternatively, the flow agent may be added to the protein product before the surfactant. Still further, the surfactant and flow agent may be added to the protein product simultaneously. Advantageously, the surfactant and flow agent may be added to the protein product in a batch-type process or via a continuous process.

An effective amount of surfactant added to the protein product is between about 0.1 wt. % and about 3.0 wt. % based upon the weight of the protein product.

An effective amount of flow agent added to the protein product is between about 0.1 wt. % and about 2.0 wt. % based upon the weight of the protein product.

BRIEF DESCRIPTION OF THE DRAWINGS

The above-mentioned and other features and advantages of this invention, and the manner of attaining them, will become more apparent and the invention itself will be better understood by reference to the accompanying drawings, wherein.

Corresponding reference characters indicate corresponding parts throughout the several views. The exemplifications set out herein illustrate preferred embodiments of the invention, and such exemplifications are not to be construed as limiting the scope of the invention any manner.

DETAILED DESCRIPTION

Figure 3:
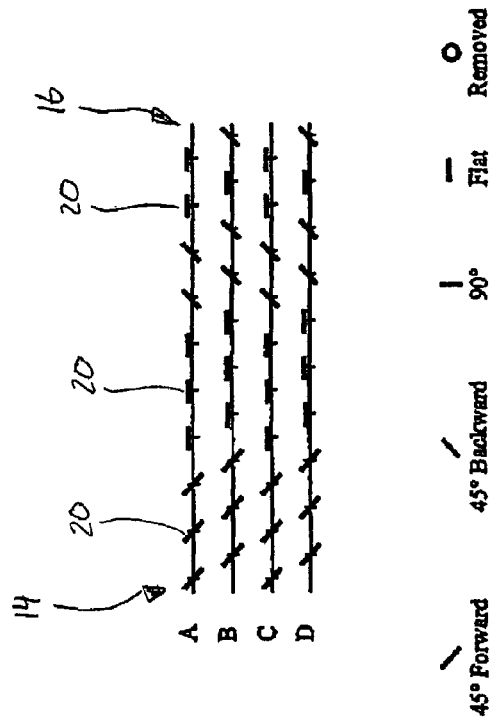
FIG. 3 is a schematic view of the paddle settings of the turbalizer of FIGS. 1 and 2.
Figure 2:
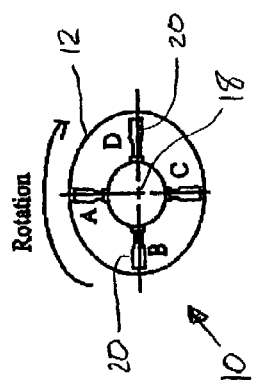
FIG. 2 is an end view of the turbalizer of FIG. 1.
Figure 1:
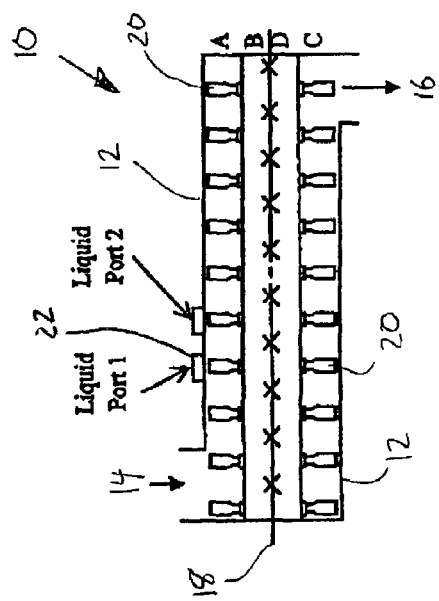
FIG. 1 is a schematic view of a turbalizer, which may be used in accordance with the present invention for adding a surfactant and a flow agent to a protein product via a continuous process, as described in Example 6.

As described in more detail below, the present invention provides a method of imparting high water dispersibility to protein products or protein-containing materials, such as powdered or particulate protein products, by the addition of a surfactant and a flow enhancing agent ("flow agent") to the protein products. The present invention is applicable to both vegetable and non-vegetable protein products.

For purposes of illustration, the present method will be described with principal reference to a vegetable protein material, specifically, soy protein. However, as shown in the Example 8 below, the present method may also be applied to other types of protein materials to impart high water solubility to same, such as casein, a non-vegetable protein found in milk.

Suitable soy protein starting materials for the present process may be produced by a process which generally encompasses dehulling whole soybeans; flaking the dehulled soybeans; extracting soybean oil from the flaked soybeans with a solvent; desolventizing the defatted soybean flakes without high heating or toasting to produce "white" flakes; and optionally, grinding the flakes to make soy flour. The foregoing procedure is well understood, and is generally described in U.S. Pat. Nos. 5,097,017 to Konwinski and 3,897,574 to Pass, each assigned to the assignee of the present invention, the disclosures of which are hereby incorporated by reference.

Specifically, dehulling is the process in which the soybean hulls are removed from the whole soybeans. If the soybeans are cleaned prior to dehulling to remove foreign matter, then the product may not be contaminated by color bodies. Soybeans also are normally cracked into about 6 to 8 pieces prior to dehulling. The hull typically accounts for about 8.0% of the weight of the whole soybean, wherein the dehulled soy bean includes about 10.0 wt. % water, 40.0 wt. % protein, 20.0 wt. % fat, with the remainder mainly being carbohydrates, fiber, and minerals.

Soybeans are conditioned prior to flaking by adjusting moisture and temperature to make the soybean pieces sufficiently plastic. The conditioned soybean pieces are then passed through flaking rolls to form flakes about 0.25 to about 0.30 millimeters (mm) thick. The soybean flakes are then defatted by contacting them with a suitable solvent, such as hexane, to remove the soybean oil. Soybean oil is used in margarine, shortening and other food products, and is a good source of lecithin, which has many useful applications as an emulsifier or surfactant, as described below. The hexane-defatted soybean flakes are desolventized to remove the solvent without toasting to produce "white" flakes. The white flakes may optionally be ground to make a soy flour. Soy flour, which may be used as a starting material for the present invention, is readily commercially available, and typically includes at least 50.0 wt. % protein (N×6.25); about 30.0-40.0 wt. % carbohydrates; about 5.0-10.0 wt. % moisture; about 5.0-10.0 wt. % ash; about 2.0-3.0 wt. % crude fiber, and less than about 1.0 wt. % fat.

The present process may also be used to impart high water dispersibility to soy protein concentrates, which include from about 65.0 wt. % to about 90.0 wt. % protein, and soy protein isolates, which include at least about 90.0 wt. % protein.

To produce an exemplary soy protein product in which at least about 80.0 wt. % of the protein therein is water soluble protein, the soy starting material is first slurried with water to a solids content of about 10.0-20.0 wt. % solids. The pH is adjusted to between about 6.5 and about 8.0. Optionally, the water may be pre-heated to a temperature of about 50-60° C., for example. The suspension is then mixed or agitated, such as with a propeller-type agitator, and the water soluble protein is extracted into the water to form a protein extracted liquid. The protein extracted liquid, a colloidal suspension, is subsequently separated from the remaining solids by a suitable separation procedure such as centrifuging, for example.

The protein extracted liquid may optionally be concentrated, such as by an ultrafiltration process, for example. Typically, a spiral-wound membrane with a molecular weight cut-off ("MWCO") of between 10,000 and 60,000 is used to concentrate the protein extracted liquid, wherein some of the water and small molecular weight components are passed through the membrane as permeate, and the proteins in the liquid, in concentrated form, are retained as retentate. Suitable spiral-wound membranes are available from vendors such as Koch Membrane Systems of Wilmington, Mass.; Osmonics of Minnetanka, Minn.; PTI Advanced Filtration of Oxnard, Calif.; and Synder Filtration of Vacaville, Calif.

The protein extracted liquid is pasteurized, such as by passing same through a jet cooker or by holding same in a steam-jacketed kettle. The pasteurization may be carried out at temperatures of between about 100° and about 150° C., preferably between about 110 and about 150° C. When the concentration step is performed, the pasteurization step may be carried out before the concentration step, after the concentration step, or both before and after the concentration step. After the protein extracted liquid is cooled, same may be dried, such as by spray drying, to form a dry soy protein product in powder or particulate form. Typically, at least about 80.0 wt. % of the protein in the resulting soy protein product is water soluble protein, as determined by measuring the Nitrogen Solubility Index ("NSI") of the protein product using AOCS method Ba 11-65. For example, a protein product having an NSI of 90% indicates that 90% of the protein therein is water soluble.

The preparation of suitable soy protein starting materials, having varying protein content and other varying characteristics, to which high water dispersibility may be imparted by the present method, are discussed in detail in the following patent applications, each assigned to the assignee of the present invention, the disclosures of which are expressly incorporated herein by reference: (1) U.S. Patent Application Publication No. 2002/0039619, entitled SOY PROTEIN PRODUCT AND PROCESS FOR ITS MANUFACTURE, filed on Aug. 15, 2001; (2) U.S. Patent Application Publication No. 2003/0045689, entitled GELLING VEGETABLE PROTEIN, filed on Jan. 15, 2002; (3) U.S. Patent Application Publication No. 2003/0054087, entitled HIGHLY SOLUBLE, HIGH MOLECULAR WEIGHT SOY PROTEIN, filed on Feb. 20, 2002; (4) U.S. Patent Application Publication No. 2002/0197384, entitled SOY PROTEIN CONCENTRATE HAVING HIGH ISOFLAVONE CONTENT AND PROCESS FOR ITS MANUFACTURE, filed on Apr. 9, 2002; (5) U.S. patent application Ser. No. 10/386,632, entitled SOY PROTEIN CONCENTRATE WITH LOW NON-DIGESTIBLE OLIGOSACCHARIDES AND PROCESS FOR ITS PRODUCTION, filed on Mar. 12, 2003; and (6) U.S. Provisional Patent Application No. 60/369691, entitled PROCESS FOR PRODUCING A HIGH SOLUBILITY, LOW VISCOSITY, ISOFLAVONE-ENRICHED SOY PROTEIN ISOLATE AND THE PRODUCTS THEREOF, filed on Apr. 3, 2002.

The protein product will typically have a particle size characterized in that greater than 10.0 wt. % of same is retained by a U.S. Sieve No. 100 (150 micron diameter) mesh screen, and greater than 20.0 wt. % of same is retained by a U.S. Sieve No. 200 (75 micron diameter) mesh screen. The particle size of the protein product may be controlled by varying the spray drying conditions, such as the spray drying pressure and/or the nozzle size of the spray drying apparatus, as set forth in Examples 1 and 2 below. Generally, particles of larger size are more dispersible in water because such particles take up water more slowly and ultimately, more thoroughly. By contrast, smaller particles take up water very quickly, and tend to stick or clump together, forming a barrier to further water penetration. However, the present process has been found to improve the water dispersibility of protein products regardless of the particle size.

High water dispersibility is imparted to the protein product by the addition of a surfactant and a flow agent thereto. Suitable surfactants include fluidized soy lecithins, such as C3FUB lecithin, and soybean oil/lecithin blends, such as a 50.0-50.0 wt. % blend of Durkex 500 high stability soybean oil and C3FUB lecithin, for example. Durkex 500 soybean oil is available from Unilever Canada Ltd. C3FUB is available from The Solae Company, formerly Central Soya Company, Fort Wayne, Ind., United States.

Generally, in the present method, the surfactant reduces the surface tension of the water in which the protein powder is dispersed, allowing the water to more effectively coat over or "wet" the protein powder particles. The surfactant may be added to the protein product at addition levels of between about 0.5 wt. % and about 3.0 wt. % based upon the dry weight of the protein product, and preferably between about 1.0 wt. % and about 1.5 wt. % based upon the dry weight of the protein product.

Suitable flow agents (also known as "anticaking" agents) include amorphous silica, for example, preferably amorphous silica having a nominal particle size of less than about 100.0 microns, preferably less than about 15.0 microns, most preferably about 7.0 microns or less. Other flow agents which may be added to protein product in accordance with the present method include such flow agents which are permitted in food products per the U.S. Federal Code of Regulations (21 C.F.R., Chapter I, part 172, Subpart E). Such flow agents include silicon dioxide, calcium silicate, iron ammonium citrate and yellow prussiate of soda, as well as sodium aluminum silicate and other silicates in certain cases. Other flow agents include Sipernat 22S, Sipernat 22, Sipernat 50, and Sipernat 820A silicas, each available from Degussa Company, and tricalcium phosphate.

In the present method, the flow agent decreases the interaction between the particles in the protein product and prevents the particles from sticking together or clumping. Typically, the flow agent may be added to the protein product at addition levels of between about 0.2 wt. % and about 2.0 wt. % based upon the dry weight of the protein product, and preferably between about 0.5 wt. % and about 1.0 wt. % based upon the dry weight of the protein product.

The surfactant and the flow agent may be added to a dry, powered or particulate form of a protein product via any mixing process which is capable of thoroughly blending the protein product, surfactant, and flow agent together, such as by high shear mixing. For example, in many of the Examples below, the foregoing components are blended using a typical food blender or food processor, such as a ribbon blender, in a batch-type process. Alternatively, the surfactant and the flow agent may be added to the protein product via a continuous process using a turbalizer or similar equipment, as discussed in Example 6.

As discussed in the Examples below, the surfactant may be added to the protein product before the flow agent, or alternatively, the flow agent may be added to the protein product before the surfactant. Still further, the surfactant and flow agent may be added to the protein product simultaneously.

The following non-limiting Examples are presented to illustrate the invention, which is not to be considered as limited thereto. In the Examples and throughout the specification, percentages are expressed on a "by weight" basis unless otherwise indicated.

EXAMPLE 1

Preparation of a Soy Protein Product Starting Material 22.7 kg of soy flour having a Protein Dispersibility Index ("PDI") of 86 was dispersed in 235.4 kg of water at 60° C., and the pH was adjusted to 7.5 using sodium hydroxide. The suspension was mixed for 30 minutes at 60° C., and then centrifuged in a decanting centrifuge. The insoluble centrifuge cake was discarded, and the supernatant was heat treated by passing same through a jet cooker at 121° C. with a holding time of 15 seconds. The resulting suspension was then cooled to 48.9° C. in a jacketed vessel, and the pH was adjusted to 7.0 using hydrochloric acid. The suspension was then ultrafiltered using a 10,000 molecular weight cutoff (MWCO) spiral wound membrane to remove about 75% of the feed volume as permeate. The retentate from the membrane was heat treated by passing through a jet cooker 93.3° C. with a holding time of 15 seconds. The retentate was then cooled to 60° C. in a jacketed vessel and spray dried. Spray drying was performed with a Spraying Systems, Inc., three-nozzle arrangement of Nozzle No. SD 58, with a pressure at the nozzles of 2000-2500 psi.

The spray dried product had the following composition and particle size, shown below in Table 1:

TABLE 1

| | |
|---|---|
| Protein (dry basis) (wt. %) | 79.79 |
| Moisture (wt. %) | 1.23 |
| Ash (as is) (wt. %) | 6.87 |
| Crude fiber (as is) (wt. %) | 0.8 |
| Nitrogen Solubility Index ("NSI") | 97% |

Particle size: 9.7 wt. % retained on a U.S. Sieve No. 100 mesh screen and 42.0 wt. % retained on a U.S. Sieve No. 200 mesh screen.

EXAMPLE 2

Modified Spray Drying Conditions for Larger and Smaller Particle Size

In Example 2a, a portion of the product of Example 1 was dried under modified spry drying conditions, resulting in a particle size of 20.4 wt. % retained on a U.S. Sieve No. 100 mesh screen and 47.0 wt. % retained on a U.S. Sieve No. 200 mesh screen. Specifically, spray drying was performed with a Spraying Systems, Inc., three-nozzle arrangement of Nozzle No. SD 76, with a pressure at the nozzles of 800-1300 psi. In Example 2b, another portion of the product of Example 1 was dried under modified spray drying conditions, resulting in a particle size of 0.4 wt. % retained on a U.S. Sieve No. 100 mesh screen and 10.0 wt. % retained on a U.S. Sieve No. 200 mesh screen. Specifically, this spray drying was performed with a Spraying Systems, Inc., three-nozzle arrangement of Nozzle No. SE 63, with a pressure at the nozzles of 5500 psi.

EXAMPLE 3

Addition of Surfactant

Surfactant was added to 9.1 kg portions of each of the products of Examples 1 and 2a as follows. The spray dried products were each added to a ribbon blender which was closed securely with a lid. A spray system consisting of a 2 fluid nozzle assembly was fitted into the center of the lid. After the blender was started, a surfactant, in the form of a fluidized soybean oil/lecithin blend, was sprayed onto the powder at a rate of 10.43 g/min. under an air pressure of 20 psi at an addition level of 0.5 wt. % of added surfactant based upon the weight of the protein product. Mixing was continued for twenty minutes after addition was completed. The lecithin blend consisted of 50 wt. % Durkex 500 high stability soybean oil (Unilever Canada Ltd.) and 50 wt. % C3FUB lecithin (The Solae Company, formerly Central Soya Company). The products from Examples 1 and 2a, with surfactant added thereto as above, were labeled as Medium Particle Lecithinated ("MPL") and Large Particle Lecithinated ("LPL"), respectively.

EXAMPLE 4

Addition of Flow agent

Flow agent was added to 9.1 kg portions of the products of Example 3 as follows. The products were each added to a ribbon blender. Then, 0.6 wt. % (54.6 gm) of flow agent, based upon the weight of the protein product, was weighed and sprinkled on top of the material in the blender, followed by 20 minutes of mixing. The flow agent was Sipernat 22S (Degussa Company), a finely divided amorphous silica having a nominal particle size of 7.0 microns. The products were labeled as Medium Particle Lecithinated with Sipernat ("MPLS") and Large Particle Lecithinated with Sipernat ("LPLS"), respectively.

EXAMPLE 5

Dispersibility Comparison

The products of Examples 3 and 4 and a commercial soy protein isolate known to be dispersible were compared in a dispersibility test. The commercial soy protein isolate was Supro 670, having an NSI of 12%, available from The Solae Company, formerly Protein Technologies, Inc. The dispersibility test consisted of weighing 10 g of test product onto the surface of 190.0 g of water in a 400 ml beaker. The mix was stirred vigorously using 120 circular stirs with a spoon. Upon completion of the stirring, the mix was poured onto a tared 20 mesh screen. After wicking away excess water from the underside of the screen, the screen was weighed to obtain the weight of undispersed residue. The results are given in Table 2 below.

TABLE 2

| Product | Nitrogen Solubility Index ("NSI") | Amount of surfactant added (wt. %) | Amount of flow agent added (wt. %) | Undispersed residue after 120 stirs (grams) |
|---|---|---|---|---|
| MPL | 97% | 0.5 | none | 8.94 |
| LPL | 97% | 0.5 | none | 13.13 |
| LPLS | 97% | 0.5 | 0.6 | 1.48 |
| MPLS | 97% | 0.5 | 0.6 | 2.98 |
| Commercial soy protein isolate (Supro 670) | 12% | unknown | none | 0.43 |

As shown in Table 2 above, the protein products to which both surfactant and flow agent were added ("LPLS" and "MPLS") showed an enhanced water dispersibility over those to which only surfactant were added ("MPL" and "LPL"), the water dispersibility approaching that of the commercial soy protein isolate. Specifically, relatively few undispersed particles remained after 120 stirs. By contrast, the protein products to which only surfactant had been added ("MPL" and "LPL") did not show a relatively enhanced water dispersibility, in that a relatively large amount of undispersed particles of same remained after 120 stirs.

EXAMPLE 6

Addition of Surfactant and Flow Agent to a Protein Material by a Continuous Process Referring to FIG. 1, the soy protein product of Example 1 and the flow agent of Example 4 (Sipernant 22S, Degussa Company) were fed simultaneously into feed inlet 14 of a turbulizer 10 (Model TCJS-8, Hosakawa Bepex, Minneapolis, Minn.). Referring to FIGS. 1-3, turbulizer 10 generally includes body 12 with feed inlet 14 and outlet 16. Shaft 18 is rotatably driven within body 12 by a motor, and includes a plurality of rows A-D of paddles 20 thereon, which paddles 20 are in close registry with the interior wall of body 12. The position of paddles 20 is adjustable, as schematically shown in FIG. 3, between a "45° forward" position in which paddles 20 drive material within body 12 towards outlet 16, a "90°" or "flat" position in which paddles do not drive material within body 12 toward either feed inlet 14 or outlet 16, and a "45° backward" position, in which paddles 20 drive material within body 12 toward feed inlet 14. As shown in FIG. 3, more paddles 20 at the front end of turbulizer 10 are disposed in the "45° forward" position than those at the rear end of turbulizer 10 which are disposed at the "45° backward" position, such that the net flow of material through turbulizer 10 is from feed inlet 14 toward outlet 16. The rotating action of paddles 20 within turbulizer 10 causes a great amount of turbulence therewithin, and results in the intimate mixture of materials within turbulizer 10.

After the soy protein product and the flow agent were added to inlet 14, addition of the surfactant of Example 3 (a soybean oil/lecithin blend) into first liquid port 22 of the turbulizer 10 followed immediately. The turbulizer was operated at a rotor speed of 1500 rpm and with the paddles thereof angled as shown in FIG. 3. The rate of addition of the soy protein product was set at 500 pounds per hour (lb/hr). The surfactant was added at an addition level of 1.5 wt. %, and the flow agent was added at addition levels of 0.2 wt. % and 0.6 wt. %, based upon the weight of the soy protein product. The soy protein product was metered into feed inlet 14 of turbulizer 10 using a K-Tron single screw LIW feeder, and the flow agent was metered into feed inlet 14 of turbulizer 10 using a K-Tron volumetric feeder. The surfactant was metered, without spraying, into first liquid port 22 of turbulizer 10 using a Master Flex pump and ¼ inch tubing. The water dispersibility of the resulting products recovered from the foregoing continuous mixing process is set forth in Table 3 below, as determined by the method described above in Example 5.

TABLE 3

| Starting Material | Nitrogen Solubility Index ("NSI") | Amount of Flow Agent added (wt. %) | Amount of surfactant added (wt. %) | Amount of undispersed residue (grams) |
|---|---|---|---|---|
| Untreated soy protein product (control) | 97% | none | none | 25.0 |
| Run A | 97% | 0.6 | 1.5 | 1.34 |
| Run B | 97% | 0.2 | 1.5 | 4.06 |

As shown in Table 3 above, the addition of flow agent at levels of 0.2 wt. % and 0.6 wt. % based upon the weight of the protein materials, in combination with the addition of surfactant, showed significant water dispersibility enhancement to the soy protein product of Example 1. The observed dispersibility enhancement was substantially equivalent to that observed using the batch-type surfactant/flow enhancing agent addition process described above in Example 5. Dispersibility enhancement was slightly greater at the higher level of flow agent addition. The foregoing results demonstrate that dispersibility enhancement is achieved when the flow agent is added to the protein material before the addition of the surfactant. It was noted that materials from turbulizer 10 had excellent flow properties conducive to handling and conveying within a continuous instantizing process.

EXAMPLE 7

Effects of the Amount and the Order of Addition of Surfactant and Flow Agent The surfactant of Example 3 (soybean oil/lecithin blend) and the flow agent of Example 4 (Sipernat 22S, Degussa Company) were added to portions of the soy protein product of Examples 1 and 2 by the batch ribbon blending process of Example 4 in various orders and levels of addition. Dispersibility was evaluated by the method described in Example 5.

TABLE 4

| Run | Particle size of starting material (% retained on 100 mesh screen) | Amount of surfactant added (wt. %) | Amount of flow agent added (wt. %) | Order of addition of surfactant (S) and flow agent (FA) | Amount of undispersed residue (grams) |
|---|---|---|---|---|---|
| 1 | 10.4 | 0.5 | 0.6 | L, FA | 2.98 |
| 2 | 20.4 | 1.0 | 0.6 | L, FA | 1.48 |
| 3 | 20.4 | 2.0 | 0.6 | L, FA | 1.03 |
| 4 | 20.4 | 3.0 | 0.6 | L, FA | 8.83 |
| 5 | 20.4 | 3.0 | none | L | 13.13 |
| 6 | 20.4 | 0.5 | 0.6 | L, FA | 0.78 |
| 7 | 20.4 | 1.0 | 0.6 | 0.5 L, FA, 0.5 L | 0.48 |
| 8 | 20.4 | 1.5 | 0.6 | 0.5 L, FA, 1.0 L | 0.48 |
| 9 | 20.4 | 2.0 | 0.6 | 0.5 L, FA, 1.5 L | 0.21 |
| 10 | 20.4 | 2.5 | 0.6 | 0.5 L, FA, 2.0 L | 0.10 |
| 11 | 20.4 | 3.0 | 0.6 | 0.5 L, FA, 2.5 L | 0.51 |
| 12 | 20.4 | 1.0 | 0.6 | 0.5 L, 0.3 FA, 0.5 L, 0.3 FA | 0.99 |
| 13 | 0.4 | 1.5 | 0.6 | FA, L | 8.39 |
| 14 | 20.4 | 1.5 | 0.6 | FA, L | 0.97 |
| 15 | 20.4 | none | 0.6 | FA | 5.23 |
| 16 | 20.4 | none | none | none | 37.67 |
| 17 | 0.4 | none | 0.6 | FA | 14.38 |
| 18 | 20.4 | none | 2.0 | FA | 5.16 |

All treatments showed enhanced dispersibility relative to the untreated control of Run 16. The greatest dispersibility enhancement was observed in the larger particle size soy protein products, which were treated with a combination of surfactant and flow agent, the flow agent in the form of finely divided, precipitated silica. It was observed that surfactant and flow agent, each added without the other as in Runs 5 and 15, 17, and 18, enhanced dispersibility but to a lesser degree than a combination of the foregoing, as in Runs 1-14. A relatively greater enhanced dispersibility was observed with the partial addition of surfactant, followed by the addition of flow agent, followed by addition of the remainder of the surfactant, as in Runs 7-11. Otherwise, the order of ingredient addition did not have any major effects upon the enhanced dispersibility observed.

An enhanced dispersibility was observed with the addition of flow agent at addition levels of up to 2.0 wt. % with respect to the weight of the starting material. In Example 2a, it was noted that the addition of flow agent at 0.2 wt. % with respect to the weight of the starting material was beneficial. The preferred range of the amount of surfactant added in this example was observed to be from about 1.0 to about 2.5 wt. % with respect to the weight of the starting material, although dispersibility enhancement was also observed at level of surfactant addition of 0.5 and 3.0 wt. %.

EXAMPLE 8

Addition of Surfactant and Flow Agent to Non-soy Protein Materials

Several non-soy protein materials, with varying protein content and protein solubility as determined by NSI, were evaluated for dispersibility enhancement as follows. One hundred grams of each protein product were weighed and spread in a thin, uniform layer on a sheet of paper (2.5 feet× 2.1 feet). 80.0 g of surfactant (the lecithin/soybean oil blend described in Example 3), and 20.0 g of petroleum ether were loaded into an aerosol spray bottle. The petroleum ether was added to lower the viscosity of the mixture. The bottle was then pressurized. A weight of surfactant, equivalent to 1.4 wt. % of the protein material, was sprayed onto the surface of the protein product. The petroleum ether evaporated from the product within a few seconds after spraying.

The product, with surfactant added, was mixed thoroughly by tumbling in a plastic bag and then was forced through a 40 mesh sieve to break up any lumps in the product. The foregoing mixing and sieving steps were repeated twice more. The product with surfactant added was divided into two equal portions. The flow agent described in Example 4 above was added to one portion at 0.6 wt. % based upon the weight of that portion. This portion was then mixed thoroughly by tumbling and forced through a 40 mesh sieve.

All of the products, including untreated controls, protein materials with surfactant only added, and protein materials with surfactant and flow agent added, were tested for dispersibility by the method No. A6c. (Analytical Methods for Dry Milk Products, 4th ed., 1978, published by A/S NIRO ATOMIZER of Copenhagen, Denmark. Source: Dairy Research Institute, Palmerston North, New Zealand). In this method, 10.0 g of protein material was placed on 100 g of water at 20° C. in a 250 ml beaker. The mixture was stirred, with a spoon, vigorously for exactly 15 seconds encompassing 25 back and forth movements across the whole diameter of the beaker. The reconstituted mixture was poured through a 60 mesh (250 micron) sieve. The solids content of the solution passing through the sieve was determined by the weight loss of a 3 ml sample that was left in an aluminum weighing dish overnight in an oven at 105° C. The percent dispersibility was determined as a ratio of the solids in solution to an expected calculated solids of 8.64 wt. % in a fully dispersed sample. Percent solids in a fully dispersed sample were calculated as follows: 10 g of powered protein ingredient typically contains 9.5 grams of solid material, the remainder being water. Therefore, the mixture to be dispersed contains 100.5 g of water and 9.5 g of solids. Wt. % solids in the mixture is then=9.5/110.0× 100=8.64 wt. %. Percent dispersibility=wt. % solids in the liquid passing through the sieve/8.64×100.

Protein products tested included a non-dispersible soy protein isolate (Protient, Inc., Saint Paul Minn.), non instant non fat dry milk containing casein, non instant dry whole milk containing casein, whey protein concentrate (80.0 wt. % protein), sodium caseinate, and calcium caseinate. The percent protein contents (wt. %) of the foregoing products were determined by AOAC method 990.03, wherein the percent protein content was calculated as N×6.25. Nitrogen Solubility Index ("NSI") was determined by AOCS method Ball-65. Commercially instantized non fat dry milk and commercially instantized whole dry milk were tested as standards of commercial dispersibility for dry milk products. The results are given in Table 5 below.

TABLE 5

| | | | % Dispersibility (Niro Method A6c) | | |
|---|---|---|---|---|---|
| Product | wt. % Protein | Nitrogen Solubility Index | Untreated | Lecithinated only (1.4 wt. % lecithin blend) | Lecithin plus 0.6 wt. % Flow Agent |
| Product of Example 1 | 79.8 | 97.0 | 8.4 | 81.7 | 87.2 |
| Soy Protein Isolate* | 88.6 | 91.6 | 19.9 | 24.0 | 45.0 |
| Soy Protein Concentrate** | 65.0 | 32.0 | 18.2 | 98.8 | 93.0 |
| Non fat dry milk | 35.8 | 95.6 | 76.3 | 85.1 | 90.7 |
| Instant non fat dry milk | 34.0 | 96 | 97.9 | NA | NA |
| Whole Dry Milk | 24.4 | 95.9 | 73.3 | 96.4 | 98.9 |
| Instantized Whole Dry Milk | 24 | 96 | 99.1 | NA | NA |
| Whey Protein Concentrate | 74.3 | 95.3 | 37.2 | 56.4 | 62.73 |
| Calcium Caseinate | 91.8 | 88.5 | 70.5 | 67.0 | 71.6 |
| Sodium Caseinate | 92.0 | 100 | 38.1 | 37.7 | 46.1 |

*Protient, Inc., Saint Paul M
**Promine HV, The Solae Company, Fort Wayne, IN

EXAMPLE 9

Additional Flow Agents

Flow enhancing agents (anticaking agents) which are allowed in food products are discussed in the Federal Code of Regulations (21 CFR, Chapter I, part 172, Subpart E). Those included are silicon dioxide, calcium silicate, iron ammonium citrate and yellow prussiate of soda. Additionally, sodium aluminum silicate and other silicates have been approved on special case bases. Agents, in addition to the Sipernat 22S cited in the previous examples, which have been evaluated for dispersibility enhancement include Sipernat 22 and Sipernat 50, related silicas but larger in particle size than Sipernat 22S; Sipernat 820A, a finely divided aluminium silicate and tricalcium phosphate. These agents each showed slight to modest improvements in dispersibility of the product of Example A combined with lecithin blend at the level of 1.0% as determined by visual inspection of stirred slurries. A test was also run in which Sipernat 22, Sipernat 50 and tricalcium phosphate were added 0.6 wt. % to the product of example 1, with lecithin blend at a 1.4 wt. % and without lecithin blend, using the procedure and testing method of Example 8. The results, shown in Table 6, indicated all of the flow agents had a strong dispersing enhancing effect when used in combination with lecithin blend at 1.4 wt. %. Flow agents had little or no effect on dispersibility of unlecithinated product.

TABLE 6

| | % Dispersibility (Niro Method A6c) | | | |
|---|---|---|---|---|
| Flow Agent | Non lecithinated product of Example 8 | Lecithinated only (1.4 wt. % lecithin blend) | 0.6 wt. % Flow Agent, no lecithin | Lecithin plus 0.6 wt. % Flow Agent |
| No Flow Agent | 8.4 | 81.7 | ND | ND |
| Sipernat 22S | ND | ND | 6.0 | 87.2 |
| Sipernat 22 | ND | ND | 9.2 | 91.4 |
| Sipernat 50 | ND | ND | 5.6 | 88.8 |
| Tricalcium phosphate | ND | ND | 9.7 | 91.6 |

ND: not determined

EXAMPLE 10

Range of Flow Agent Effect

The surfactant of Example 3 was added to portions of the soy protein product of Example 1 at addition levels of 1.0 wt. % based upon the weight of the soy protein product. Then, for each of the portions, finely divided precipitated silica (Sipernat 22S) was blended in a Waring blender with the soy protein products at addition levels of 0.1, 0.5 and 1.0 wt. %, with respect to the weight of the soy protein product. Each of the foregoing soy protein products showed significant improvement in water dispersibility as visually determined after stirring 5.0 wt. % slurries of the soy protein product in water. The soy protein product with silica added at a level of 0.1 wt. % exhibited some clumping but retained a strong dispersibility enhancement. The soy protein product with silica added at an addition level of 1.0 wt. % showed no improvement in water dispersibility over the soy protein product with silica added at an addition level of 0.5 wt. %.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A water dispersible protein product, comprising;
   a soy protein-containing material containing from about 65.0 wt. % to about 90.0 protein, characterized in that greater than 10.0 wt. % of same is retained by a U.S. Sieve No. 100 (150 micron diameter) mesh screen, wherein at least a portion of the protein therein is water soluble;
   a fluidized soy lecithin surfactant; and
   a flow agent, where said flow agent comprises precipitated amorphous silica having a particle size between 7 µm and 100 µm;
   wherein the soy protein-containing material is prepared by a method comprising the steps of:
   providing a substantially defatted soy protein material;
   extracting soy protein from the material with water;
   removing solids from the material to obtain a protein extracted liquid;
   subjecting the protein extracted liquid to ultrafiltration wherein the ultrafiltration is conducted using an ultrafiltration membrane having a molecular weight cut-off between about 10,000 and about 60,000;
   pasteurizing the protein extracted liquid; and
   drying the protein extracted liquid.

2. The protein product of claim 1, wherein said protein-containing material has a Nitrogen Solubility Index ("NSI") of at least about 80%.

3. The protein product of claim 1, wherein said surfactant is added to said protein-containing material at an amount of between about 0.1 wt. % and about 3.0 wt. % based upon the weight of said protein-containing material.

4. The protein product of claim 1, wherein said flow agent is added to said protein-containing material at an amount of between about 0.1 wt. % and about 2.0 wt. % based upon the weight of said protein-containing material.

* * * * *